United States Patent [19]

Tatekawa et al.

[11] 4,196,875

[45] Apr. 8, 1980

[54] MAGNETIC TAPE RECORDING AND/OR REPRODUCING APPARATUS

[75] Inventors: Masaichiro Tatekawa, Kawachinagano; Toshiharu Sasaki, Kawanishi; Yoshihito Urata, Katano, all of Japan

[73] Assignee: Matsushita Electric Industrial Co., Ltd., Kadoma, Japan

[21] Appl. No.: 915,307

[22] Filed: Jun. 12, 1978

[30] Foreign Application Priority Data

Jun. 13, 1977 [JP] Japan .................................. 52/70303

[51] Int. Cl.² ............................................. G11B 15/32
[52] U.S. Cl. ........................................ 242/209; 360/73
[58] Field of Search .............................. 242/200–202, 242/204, 208–210; 318/6, 7, 326; 360/71–73, 90

[56] References Cited

U.S. PATENT DOCUMENTS

| | | | |
|---|---|---|---|
| 3,916,441 | 10/1975 | Jones | 360/90 |
| 3,968,942 | 7/1976 | Wrobel | 242/204 |
| 4,079,300 | 3/1978 | Sleger | 318/326 |

*Primary Examiner*—Leonard D. Christian

*Attorney, Agent, or Firm*—Wenderoth, Lind & Ponack

[57] ABSTRACT

A magnetic tape recording and/or reproducing apparatus having two electric motors, one of which is a capstan driving motor and the other is a reel driving motor. A tape drive capstan is directly driven by the said capstan driving motor without any belts, and transports magnetic tape at a constant velocity by coaction with a pinch roller during recording or reproducing of the magnetic tape. The apparatus has two tape winding reels, and the magnetic tape is wound up by either of the two tape winding reels according to the direction in which the magnetic tape is required to be transported. Each of the two tape winding reels is respectively rotated through idle wheels by the reel driving motor, which is separate from the two tape winding reels, without any slippage at the tape winding reels during recording or reproducing. The idle wheels can engage with both an output shaft of the reel driving motor and one or the other of the two tape winding reels to transmit the rotation of the output shaft of the reel driving motor to one or the other of the two tape winding reels during recording, reproducing and fast feed in both the forward and backward direction of the magnetic tape.

12 Claims, 14 Drawing Figures

MAGNETIC TAPE RECORDING AND/OR REPRODUCING APPARATUS

BACKGROUND OF THE INVENTION

This invention relates to magnetic tape recording and/or reproducing apparatus comprising magnetic tape and magnetic heads by which various signals can be recorded and/or reproduced.

In prior magnetic tape recording and/or reproducing apparatus, there is a one-motor system, wherein one conventional electric motor is provided and an output shaft of said motor is connected by a rubber belt with a fly-wheel attached to a tape drive capstan and which has a big inertia. Said tape drive capstan is rotated by said motor through said rubber belt and transports magnetic tape at nearly constant velocity, and at the same time, said magnetic tape is wound up by tape winding means rotated by said motor through idle wheels through a frictional slip mechanism made of materials of large frictional coefficient such as felt, which contacts with both said tape drive capstan and said tape winding means. By magnetic heads for recording and/or reproducing which contact said moving magnetic tape, various signals can be recorded and/or reproduced. For fast feed of said magnetic tape in both the forward and backward direction, another group of idle wheels are brought into contact with both said tape drive capstan and tape winding means, by which the speed of rotation of said tape drive capstan is increased and transmitted to said tape winding means to transport said magnetic tape rapidly in the required direction.

There is also a two-motor system, wherein although magnetic tape is transported by same method as described above for tape recording or reproducing, another electric motor is provided to rotate said tape winding means for fast feed of said magnetic tape in both the forward and backward direction.

In the two systems described above, because said tape drive capstan, which is most important in transporting said magnetic tape at a stable constant velocity, is driven by said rubber belt, various problems occur such as that the quality varies widely from apparatus to apparatus, and characteristics of magnetic tape transportation vary due to change of characteristics of said rubber belt because of aging, change of environment, and so on. Further, because said frictional slip mechanism which slips at a nearly constant rotational torque is used for rotating said tape winding means, problems occur as described above and the characteristics of magnetic tape transportation are caused to deteriorate.

To overcome said problems, a three-motor system or a four-motor system has been proposed, wherein said tape drive capstan and said tape winding means are each directly driven by an electric motor without any frictional slip mechanism. But, because said electric motor used in such a three- or four-motor system has a complex construction, in spite of its expensive price the characteristics of rotation of said motor is not as good as can needed for said tape drive capstan, and it is so difficult to make a practical electric motor suitable for directly driving said tape drive capstan that apparatus with such a three- or four-motor system is not widely used in general.

Further, most of the prior motors which use a commutator and a brush have only a short lifetime, and troubles due to faults of said brush often occur, and because of the use of such a brush, wow and flutter during rotation of said motor is increased.

In view of the foregoing, it is obvious that a new improved tape transporting system is required to provide a compact slim apparatus with improved characteristics for tape recording and/or reproducing without appreciable expenditure and difficulties in construction.

In U.S. Pat. No. 3,968,942, a two-motor system for tape transportation is disclosed. However, although such two-motor system is suitable for a rather compact slip apparatus with improved characteristics for tape recording and/or reproducing, the apparatus described in this patent is not very compact, and is still unsatisfactory with respect to the constancy and stability of tape transportation.

BRIEF SUMMARY OF THE INVENTION

Accordingly, it is an object of this invention to provide an apparatus which is very compact and which is capable of transporting the tape with high accuracy, constancy and stability.

This object is achieved according to this invention by providing a magnetic tape recording and/or reproducing apparatus comprising in combination, a capstan driving motor, a pair of tape winding means, a reel driving motor, a pinch roller and at least one idle wheel, said capstan driving motor comprising: a magnetic tape driving capstan for driving the tape in cooperation with said pinch roller; a rotor having a rotor magnet with a plurality of magnetic poles, and necessary inertia; a stator with a plurality of armature coils arranged around said magnetic poles of said rotor magnet; distributing means for controlling the distribution of electric current to said armature coils; speed controlling means for keeping said capstan rotating at a given constant peripheral velocity; and driving circuits which supply electric current to said armature coils for rotating said rotor, said pair of tape winding means comprising: a first tape winding hub for supplying said magnetic tape; and a second tape winding hub for taking up said magnetic tape.

said reel motor is being spaced from said tape winding means and being able to rotate in both directions for selectively rotating either of said tape winding means, said at least one idle wheel being engageable both the output shaft of said reel driving motor and one or the other of said tape winding means, whereby said magnetic tape is transported at a given constant velocity by co-action of both said capstan rotating at a constant periphery velocity and said pinch roller during tape recording or reproducing, and is wound up by said second tape winding hub engaged with and rotated by said at least one idle wheel which engages the rotating output shaft of said reel driving motor, and for fast feed of said magnetic tape in both the forward and backward directions, said pinch roller is separated from said capstan, and one or the other of said tape winding means takes up said magnetic tape according to the direction in which said magnetic tape is required to be transported, said tape winding means being rotated by said at least one idle wheel engaged with both said tape winding means and the rotating output shaft of said reel driving motor.

The capstan driving motor can have a flat hollow cylindrical rotor magnet the rotational plane of which parallel to a flat plane stator plate, so that the armature coils and distributing means can be used instead of a brush and commutator, and they are all able to be compactly disposed below the rotor, whereby the whole apparatus can be made compact.

Furthermore, when said armature coils and some members of said distributing means are arranged on a single flat plane stator plate, good structural accuracy can be achieved without difficulties so that component members can provide a given constant peripheral of said tape drive capstan.

DESCRIPTION OF THE DRAWINGS

Embodiments of the invention will now be described by way of example with reference to the accompanying drawings, in which.

DETAILED DESCRIPTION

Figure 1:
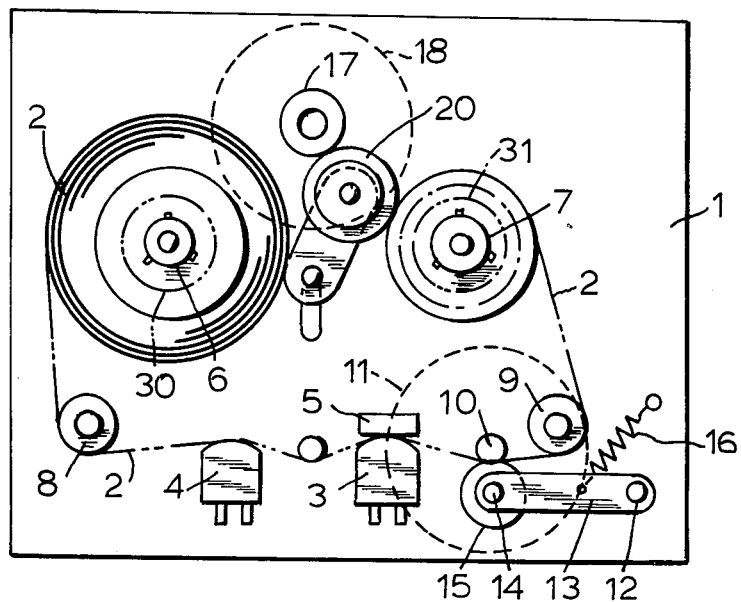
FIG. 1 is a schematic plan view of the parts of a magnetic tape recording and/or reproducing apparatus according to an example of the invention with the parts in position for tape recording or reproducing.

FIG. 1 is a plan view of essential parts of a magnetic tape recording and/or reproducing apparatus according to an example of the invention showing the parts of the apparatus during recording or reproducing. In FIG. 1, on a base plate 1 is arranged magnetic tape 2 (which is hereinafter called simply "tape", recording and/or reproducing head 3, erasing head 4 and means (described in detail later) for transporting said tape 2 in fixed or movable state respectively. Said recording and/or reproducing head 3 and erasing head 4 are arranged to move on said base plate 1 to contact with and separate from said tape 2. Further, a pad 5 is provided in order to ensure the contact of said recording and/or reproducing head 3 with said tape 2.

The means for transporting tape 2 comprises tape winding means consisting of a pair of tape winding hubs 6 and 7, the first of which is for supplying and the second for taking up said tape 2 which is wound on tape reels 30 and 31, tape guides 8 and 9, a capstan driving motor 11 directly connected to a tape drive capstan 10, a pinch roller 15 rotatably mounted on a pivotable pinch roller arm 13 on a supporting shaft 14 which is pivoted by a coil tension spring 16 to move the pinch roller 15 into contact with said tape driven capstan 10, a reel driving motor 18 which has an output shaft 17 for rotating said tape winding hubs 6 or 7 selectively and is able to rotate reversibly, idle wheels 20 which can contact both the output shaft 17 of the reel driving motor 18 and one or the other of said tape winding hubs 6 or 7, and a frictional transmission mechanism disposed in the transmitting path between said tape winding hubs 6 and or 7 and said output shaft of reel driving motor 18.

If what is called a "cassette tape" is used, said tape guies 8 and 9, pad 5, and tape reels 30 and 31 are provided inside the cassette.

The construction and performance of said tape winding hubs 6 and 7, idle wheel 20, and said frictional transmission mechanism will be described with reference to the drawings from FIG. 2 to FIG. 7. Since said tape winding hub 6 has the same fundamental construction as the tape winding hub 7, hereinafter only the tape winding hub 7 will be described which acts as a tape taking-up member during tape recording and reproducing.

Figure 2:
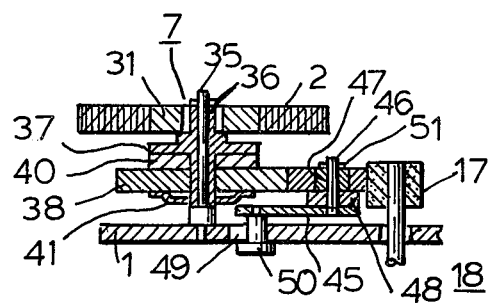
FIG. 2 is a schematic cross-sectional side view of tape winding means, idle wheels, frictional transmission mechanism and other associated parts of the apparatus.

As shown in FIG. 2, the tape winding hub 7 comprises a supporting shaft 35 fixed on the base plate 1 and a reel wheel 36 having flange portion 37 is rotatably mounted on said supporting shaft 35. Said frictional transmission mechanism comprises a circularly shaped friction disk 40, a rotatable wheel 38 and a stop spring 41, said friction disk 40 being a spring, a felt pad or the like mounted on the lower side of the flange portion 37 or wheel 36.

Although said rotational wheel 38 is rotatable on said reel wheel 36, it is urged toward the flange portion 37 of said reel wheel 36 under a predetermined pressure by said stop spring 41 so as to engage with said friction disk 40. Therefore, the rotating force of said rotational wheel 38 is transmitted to said reel wheel 36 through said friction disk 40. Said idle wheel 20 comprise a wheel 47, a friction disk 48, a lever 45 for displacing said wheel 47, and a supporting pin 50. The wheel 47 is made of rubber material or the like and is pivotably mounted on supporting shaft 46 fixed on one end of lever 45, and said friction disk 48 is made of a felt or the like, and the other end of said lever 45 is pivoted on said supporting pin 50 for mounting said lever 45 on said base plate 1. Pin 50 is slidable in an elongated aperture 49 in the base plate so as to be free for sliding and pivoting movement on said base plate 1. The wheel 47 is pressed by stop spring 51 against said friction disk 48 on said lever 45, so that wheel 47 is placed under a constant rotational load.

Next, the operation of above described means will be explained. FIG. 2 shows the idle wheel during tape transporting, wherein said wheel 47 contacts both said output shaft 17 of said reel driving motor 18 and said rotational wheel 38. Therefore, the rotating force of said reel driving motor 18 is transmitted to said rotational wheel 38 through said wheel 47 and thence to said reel wheel 36 through said friction disk 40, and rotates said tape reel 31 attached to said reel wheel 36 to take up tape 2. Since the frictional transmission mechanism is constructed so as to operate with no slip in this condition, said rotational wheel 38 and reel wheel 36 move together. Only when an extraordinary amount of tape tension occurs does slipping between said rotational wheel 38 and reel wheel 36 occur at the friction disk 40 in order to prevent tape 2 from breaking.

In the prior apparatus, as tape is transported through slipping frictional transmission mechanism during tape recording and reproducing, and since the performance of the frictional transmission mechanism is not stable when there are changes of the environment, there is often a deterioration in performance. But in the apparatus constructed according to the invention, because no slip occurs during the usual tape transporting, the performance is kept stable and high in quality.

Figure 3:
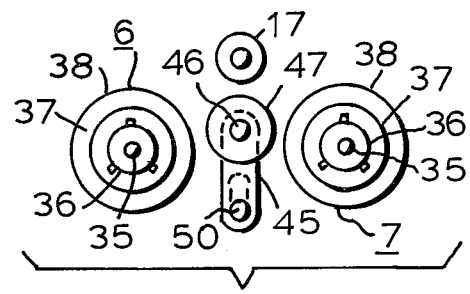
FIG. 3 is a schematic plan view showing parts of the apparatus in position in which said apparatus is inoperative.

Next, the operation of idle wheel 20 will be explained with reference to the drawings from FIG. 3 to FIG. 5. FIG. 3 is a plan view which shows the essential parts of the apparatus in positions in which the tape is not transported, i.e. wherein said wheel 47 of said idle wheel 20 is spaced from both said output shaft 17 of said reel driving motor 18 and the rotational wheel 38 of both winding hubs 6 and 7. When a signal is given to actuate the apparatus, said reel driving motor 18 begins to rotate, and at the same time said idle wheel 20 is moved forward, i.e. upwardly in FIG. 3, by any well-known electro-magnetic means or other mechanical means to cause said idle wheel 47 to contact said output shaft 17.

Figure 4:
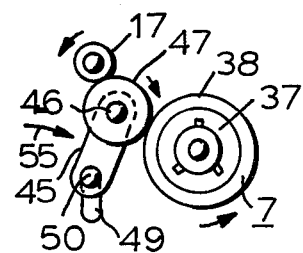
FIG. 4 is a schematic plan view showing parts of the apparatus in position for reproducing or forward fast feed of magnetic tape.

Then, because said output shaft 17 is rotating counterclockwise while the apparatus is the recording or reproducing or forward fast feed mode, said wheel 47 is rotated clockwise as shown in FIG. 4. A constant rotational load is given to said idle wheel 47 by said friction disk 48 which causes, said lever 45 to be automatically pivoted around said supporting pin 50 as a pivot point in the direction of the arrow 55 by a pivoting force exerted on said wheel 47 in the clockwise direction. The displacement causes said wheel 47 to positively contact said rotational wheel 38, and said reel wheel 36 is thus rotated to wind up the tape 2.

Figure 5:
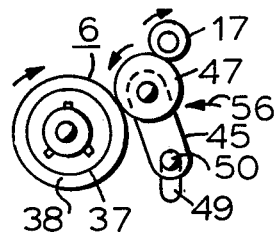
FIG. 5 is a schematic plan view showing parts of the apparatus in positions for backward fast feed of magnetic tape.

For backward fast feed of said tape 2, said output shaft 17 rotates clockwise as shown in FIG. 5, and by a similar process, said wheel 47 is automatically pivoted in the direction of the arrow 56 to cause backward winding of said tape 2.

Although it has been described above that there is no slip in said frictional transmission mechanism according to the invention during transporting of said tape 2, there is actually little slip between said wheel 47 and said friction disk 48. However, this slipping is to provide torque for automatic displacement of lever 45, and the slip is actually small enough not to cause deterioration in the characteristics of tape transportation. For further improving these characteristics, an additional mechanism can be employed for cutting off the connection between said frictional disk 48 and said wheel 47 when said idle wheel 47 contacts both said output shaft 17 and said rotational disk 38. Furthermore, direct displacement of lever 45 by electrical or mechanical means excited by the signal to actuate the apparatus instead of using said frictional disk 48 will overcome the above-mentioned problem completely.

Figure 6:
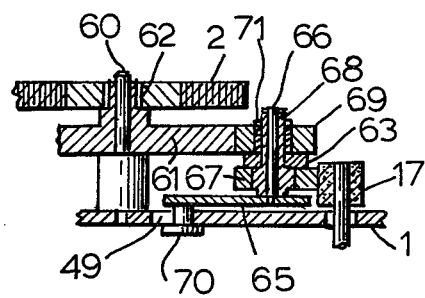
FIG. 6 is a schematic cross-sectional side view of tape winding means, idle wheels, a frictional transmission mechanism and other associated parts of another example of the apparatus according to the invention.

Another other examples of winding hubs 6 and 7, frictional transmission mechanism, and idle wheel 20 according to the invention is shown in FIG. 6. Said winding hub 7 comprises a supporting shaft 60 fixed on said base plate 1, and a reel wheel 62 which has rotational flange portion 61 and is freely rotatably mounted on said supporting shaft 60. Said frictional transmission mechanism comprises a friction disk 63 which forms part of said idle wheels 20 and is made of spring material, felt or the like. Said idle wheel 20 comprises: a first wheel 67 which has a sleeve portion 68 which is freely rotatably mounted on a supporting shaft 66 fixed on one end of a lever 65; a second wheel 69 which is freely rotatably mounted on said sleeve portion 68; and a supporting pin 70 to which the other end of said lever 65 is fixed and which is rotatably and slidably mounted in an elongated aperture 49 in said base plate 1 so that said lever 65 can slide along and rotate relative to said base plate 1.

Said first wheel 67 and said second wheel 69 are connected together by a spring 71 attached to the sleeve portion 68 and said friction disk 63 therebetween, the rotating force of said wheel 67 being transmitted to said second wheel 69 through said friction disk 63. Furthermore, as shown in the drawing, said first wheel 67 contacts said output shaft 17 of said reel driving motor 18, and said second wheel 69 contacts said rotational flange portion 61 of said reel wheel 62, respectively.

Next, the operation will be explained, which is fundamentally the same as that described for the embodiment of FIG. 3 to FIG. 5. The rotational force of said output shaft 17 of said reel driving motor 18 is transmitted to said first wheel 67, said friction disk 63, said second idle wheel 69, and said rotational flange portion 61 in order, and consequently said reel wheel 62 rotates in order to wind up said tape 2 on a tape reel 31. During normal tape transportation, because no slip occurs at said friction disk 63, said first wheel 67 and said second wheel 69 rotate together, but when an extraordinary tape tension occurs, for example at the end of said tape 2, mechanical slip occurs at said friction disk 63 in order to prevent said tape 2 from being broken off. The above described electrical or mechanical means can be used for displacing the lever 65 according to the operating mode of the apparatus. Alternatively, such displacement can be achieved automatically by giving the friction disk 63 the same function as that of the friction disk 48, i.e. by employing a mechanism having controlling means for controlling the rotation of said second wheel 69 which comprises a pressure plate 76 pivotably mounted on a pin 75 fixed on said lever 65 as shown in FIG. 7, wherein the top end of said pressure plate 76 contacts said second wheel 69 as shown in the drawing due to the force of a spring 77 in order to prevent said second wheel 69 from rotating.

The lever 65 is operated by actuating signals for the apparatus, whereby said first wheel 67 is brought into contact with said output shaft 17 to rotate said first wheel 67. But at this moment said second wheel 69 is prevented by said pressure plate 76 from rotating, so the reactive force occurs on said lever 65 due to said friction disk 63 as described before connection with FIG. 2, and the reactive force automatically displaces said lever 65 to cause said second wheel 69 to contact said rotational flange portion 61 as shown in FIG. 4 or FIG. 5. At the same time when said second wheel 69 contacts said rotational flange portion 61, the other end of said pressure plate 76 is pressed downwardly by a stop 80, and therefore said pressure plate 76 is displaced in the direction of the arrow 81 to be separated from said second idle wheel 69. By this process, the same state as shown in FIG. 6 achieved, and the rotation of said output shaft 17 is transmitted to said reel wheel 62.

Figure 7:
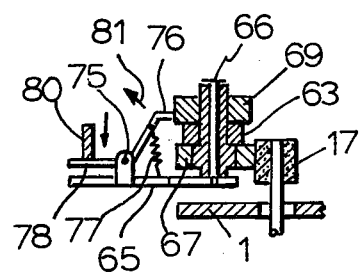
FIG. 7 is a schematic cross-sectional side view of idle wheels, frictional transmission mechanism and other associated parts of still another of the apparatus according to the invention.

It is apparent from the above description that the above described construction according to the invention has superior characteristics to those of a conventional apparatus, because the construction shown in FIG. 6 and FIG. 7 does not require the use of a conventional frictional transmission mechanism for said winding hubs 6 and 7, and makes it possible to produce the slip needed for tape protection and automatic displacement of said idle wheel 20 according to the operation mode by using only one friction disk 63 in said idle wheel 20.

Said stop 80 can be easily operated and controlled by electro-magnetic means such as an electro-magnet, or mechanical means such as a cam mechanism.

Figure 8:
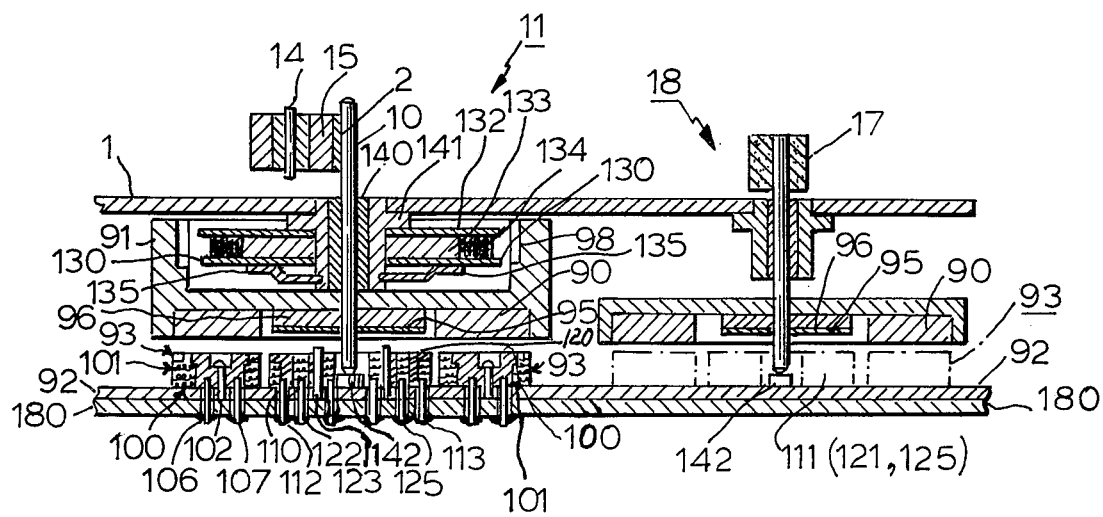
FIG. 8 is a cross-sectional side view of a capstan driving motor and reel driving motor of the apparatus.
Figure 9:
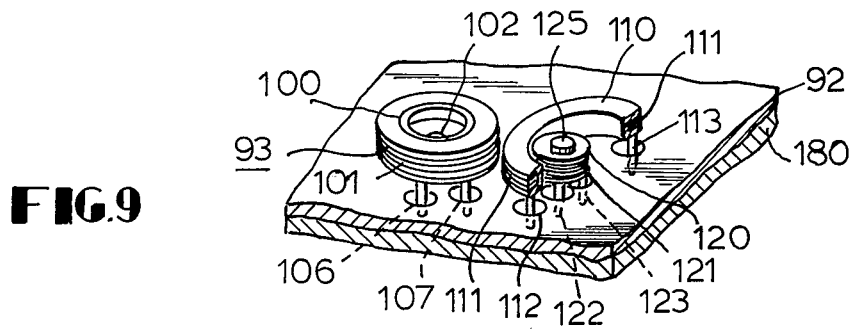
FIG. 9 is a perspective view, partly in cross section, of a portion of the armature coils and distributing means for controlling the distribution of electric current to said armature coils of the apparatus, with parts not necessary for an understanding of the invention omitted.

The construction and operation of said capstan driving motor 11 and said reel driving motor 18 will next be described with reference to the drawings from FIG. 8 to FIG. 14. FIG. 8 is a cross-sectional side view of the capstan driving motor 11 and the reel driving motor 18 shown in FIG. 1. Because the construction of said reel driving motor 18 is the same as said capstan driving motor 11 in fundamental principle, said capstan driving motor 11 will be described here as representative. Said capstan driving motor 11 comprises: a rotor 91 which has a tape drive capstan 10 fixedly inserted therein, a magnet 90 having a plurality of magnetic poles, and inherent inertia; a plurality of armature coils 93 mounted on a stator 92 and equidistantly or nearly equidistantly spaced from each other; distributing means for producing position signals for controlling the distribution of electric current to said armature coils 93 according to the rotational position of said rotor 91; an electrical driving circuit which sequentially supplies electric current to said armature coils 93 according to said position signals; and speed controlling means for keeping the rotation of said rotor 91 at or nearly at a given constant speed.

Figure 11:
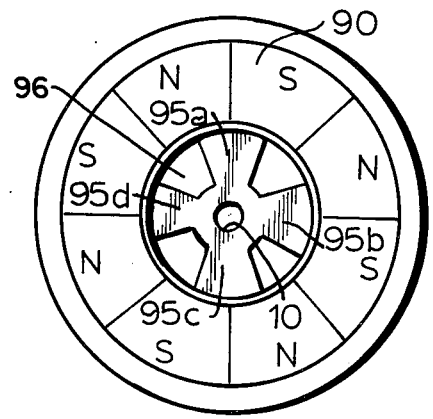
FIG. 11 is a plan view of the rotor of the apparatus.

Said magnet 90 is in the shape of a hollow plane ring, and has plurality of "N" and "S" magnetic poles alternately and equidistantly spaced on the lower surface of said magnet 90 as shown in FIG. 11. As an example, a magnet with eight magnetic poles is shown. Said rotor 91 comprises a position signal distributor and a toothed portion 98 made of magnetic material, said position signal distributor comprising a distribution plate 95 functioning as magnetic flux switching means and a cylindricallyshaped supporting disk 96 for supporting said distribution plate 95 and acting as magnetic flux conducting means, both being component members of the distributing means described later, so as to distribute magnetic flux for generating the position signals; and said toothed portion 98 has a number of gear teeth which determine the frequency of the output signal of the frequency generator used for said speed controlling means for controlling the rotation of said rotor 91.

Figure 10:
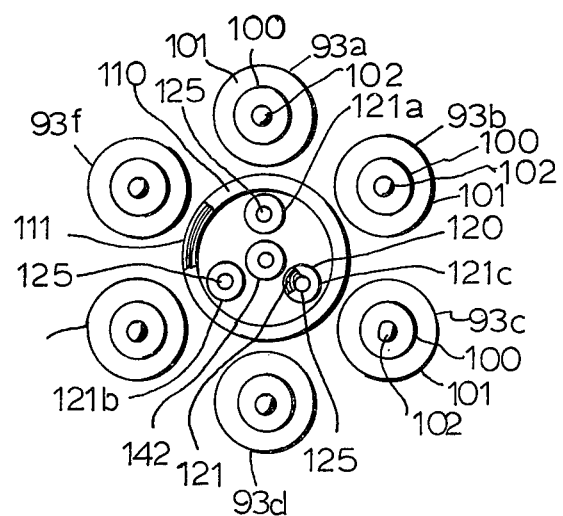
FIG. 10 is a plan view showing the arrangement of said armature coils and coil-parts of said distributing means, with parts not necessary for an understanding of the invention omitted.

Furthermore, each of said armature coils 93 comprises an armature coil bobbin 100 made of insulating material, a thin conductive wire 101 wound around said bobbin 100 in a plurality of turns, and a pin 102 for securing said armature coil bobbin 100 to said stator 92. The ends of said conductive wire 101 are connected to a pair of conductive terminals 106 and 107 extending into said armature coil bobbin 100 and for connecting armature coil 93 with a printed circuit base 180 disposed on the surface of said stator opposite the surface of said stator 92 on which said armature coils 93 are positioned, by said conductive terminals 106 and 107 which are further connected electrically to the later described electric driving circuit. The disclosed embodiment has six armature coils 93a, 93b, 93c, 93d, 93e and 93f which are equidistantly or nearly equidistantly spaced from each other around said magnet 90 as shown in FIG. 10. In this example, a generally well-known three-phase driving system is used, in which the six armature coils are symmetrically arranged around the center of said magnet 90, that is, armature coils 93a and 93d, armature coils 93b and 93e, and armature coils 93c and 93f constitute three pairs of armature coils to form a three-phase driving system, which drives said magnet 90 which has eight magnetic poles.

The distributing means are placed inside of said hollow shaped magnet 90, and comprise: the position signal distributor secured to said rotor 91 for distributing magnetic flux; and the position signal detector which comprises active detector coils and passive detector coils both arranged on said stator 92 in parallel with and facing the rotational surface of said rotor 91 and spaced from said rotor 91. Said distributing means controls the distribution of the electric current to said armature coils 93 in accordance with the so called brushless type of operation using mutual electro-magnetic reaction between said active detector coils and said passive detector coils. As shown in FIG. 8 and FIG. 11, said position signal distributor comprises: the magnetic flux switching means identified as the distribution plate 95 which is made of conductive material having apertures equidistantly spaced from each other to selectively pass the magnetic flux generated from said active detector coils; and the magnetic flux conducting means identified as the supporting disk 96 for supporting the distribution plate 95 in a manner such that the distribution plate 95 faces both said active and said passive detector coils.

Said supporting disk 96 is made of materials, such as pure iron, having a small energy loss for transmitting high frequency magnetic flux derived from said active detector coils, and is partly exposed through said apertures in said distribution plate 95 as shown in FIG. 11. The outside dimensions of both said distribution plate 95 and said supporting disk 96 are at least equal to or greater than the outside dimension of said active and passive detector coils, and the shapes are circular. The form of said distribution plate 95 is determined by the number of pairs of magnetic poles of said magnet 90, and since the number of pairs of magnetic poles is four in the example, said distribution plate 95 has four equidistantly outwardly diverging legs 95a, 95b, 95c and 95d which act as shields for the magnetic flux, and the number of said legs corresponds to the number of pairs of magnetic poles in the rotating direction of said magnet 90. Further, as shown in FIG. 11, said distribution plate 95 has the radial axes of said legs 95a, 95b, and 95d coincide with the lines corresponding to the joints between the magnetic poles of each pair, respectively. It is possible to construct said supporting disk 96 integrally with said rotor 91 which holds said magnet 90.

The active detector coil for each stator comprises an active coil bobbin 110 in the form of a hollow circular shaped insulator and an active coil 111 made of a thin conductive wire wound around said active coil bobbin 110, and said active detector coil is placed at a position inside the circle of said armature coils 93 as shown in FIG. 10. Said active coil bobbin 110 has two conductive terminals 112 and 113 to which the ends of said conductive wire 111 are connected. As shown in the cross-sectional view in FIG. 9, said passive detector coils are placed inside the active detector coil, and each passive detector coil comprises a passive coil bobbin 120 made of an insulator, a passive coil 121 made of a thin conductive wire wound around said passive coil bobbin 120, and a passive coil core 125 which is attached at the center of said passive coil bobbin 120 in order to place said passive detector coil at the desired position.

Said armature coils 93 are driven in a three-phase driving mode, and thus three passive detector coils 121a, 121b and 121c are provided as shown in FIG. 10, corresponding to the three phases, respectively. Said passive detector coils 121a, 121b and 121c are arranged equidistantly or nearly equidistantly spaced from each other, and the centers of said passive detector coils are radially aligned with the centers of the three-phase armature coils 93a–93d, 93b–93e and 93c–93f respectively. Each passive coil bobbin 120 has two conductive terminals 122 and 123 to which the ends of said conductive wire of said passive coil 121 are connected. Each passive coil core 125 is directly secured on said stator 92 to position said three passive detector coils at above mentioned positions. It is preferable that each passive coil core 125 be made of a material such as those for the above mentioned supporting disk 96, which have a small energy loss for transmitting the high frequency magnetic flux in order to achieve a high efficiency of generation of induction voltage in said passive coil 121. Further, said passive coils 121 are electrically connected with said armature coils 93, respectively, by the electric driving circuit which will be described later.

The relationships of said distribution plate 95 with the position of the magnetic poles of said magnet 90, and the relationships of said passive detector coils with the positions of said armature coils 93 are important in establishing the characteristics of said capstan driving motor 11. The above described construction is the most preferable arrangement with respect to accuracy, assembling and efficiency, because it places the parts in desirable relationships. Of course, the invention is not restricted to the relationships of the arrangement shown in the drawings. Various modifications of the arrangements of said distribution plate 95 and said passive detection coils can be made if they are such that said magnet 90 can keep rotating continuously by the distribution of electric current to said armature coils 93 in order according to the changes of the magnetic poles of said magnet 90.

Figure 12:
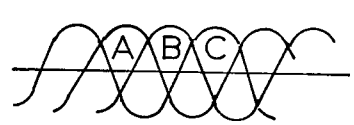
FIG. 12 is a graph showing the shape on output signal wave from said distributing means.

The generation of the above described means for distributing the electric current will be mentioned later. A so called brushless capstan driving motor is made possible by the provision of said means for controlling the distribution of the electric current, wherein an electro-magnetic translating action is used such that high frequency changes of magnetic flux derived from the high frequency alternating electric current applied to said active coils 111 are distributed to said passive coils 121 in order by co-action of said distribution plate 95 and said supporting desk 96; three-phase alternating voltage is induced in said passive coils 121 as shown in FIG. 12; and said electric driving circuit which will be described later controls the electric current to said armature coils 93 according to said induced voltage to keep the magnet 90 rotating continuously at a given constant speed.

Figure 13:
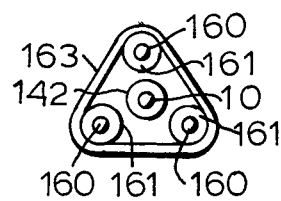
FIG. 13 is a plan view of coil-parts of said distributing means of another example of the apparatus according to the invention.

In FIG. 13, another example of the arrangement of said active detector coil and said passive detector coils is shown. FIG. 10 both said active detector coil and said passive detector coils have active coil bobbins and passive coil bobbins, respectively, which are independent of each other. But similar performances to those obtained thereby can be obtained by an arrangement like that of FIG. 13 in which the three passive coil cores 160 have passive coils 161 directly wound thereon, and an active coil 163 is wound outside said passive coils 161.

The said active and passive detector coils are both disposed on one side of said stator 92, and on the other side of said stator 92 is a printed circuit base 180 which is connected to the later described electric driving circuit. Since the ends of said active and passive coils are connected to said printed circuit base 180 through the conductive terminals 112, 113, 122 and 123, the assembling is made very easy.

Next, the speed controlling means to keep said rotor 91 rotating at a constant speed will be described. Conventionally, various methods have been proposed for speed controlling means. In the example described here, a frequency generator is employed. The speed controlling means comprises: a first disk 131, a circular shaped second disk 132, a magnet 133 and a generation coil 134, said first disk 131 having a toothed portion 130 having the same number of teeth as said toothed portion 98 on said rotor 91 and which portion 98 determines the frequency of the generated voltage, and said first disk 131 is disposed opposite said toothed portion 98; said magnet 133 has a hollow circular shape and is fixed between said first disk 131 and said second disk 132; and said generation coil 134 is wound around said magnet 133 and secured by a washer 135 on a housing 141 which is fixed to said base plate 1 holding a bearing 140 for said tape drive capstan 10.

A closed magnetic circuit is formed around said generation coil 134 because the magnetic flux derived from said magnet 133 passes said first disk 131, said toothed portion 98 of said rotor 91, and said second disk 132 in the recited order. Thus, a change of the magnetic flux caused by the rotation of said rotor 91 generates an electric signal of the frequency determined by the number of the teeth of said toothed portion 98 and 130 in said generating coil 134. The means for controlling the rotating speed of said rotor 91 by comparing said frequency of the generated voltage with a reference frequency by the electric driving circuit which comprises semiconductor devices and so on is the speed controlling means of the example described herein. Since any well-known electrical arrangement can be used for said speed controlling means a detailed explanation and drawings therefore are omitted here.

The fundamental construction of said capstan driving motor 11 has been described above. Since said reel driving motor 18 has the same constriction as said capstan driving motor 11, but without said speed controlling means, the description of said reel driving motor 18 is omitted here. In said capstan driving motor 11, said tape drive capstan 10 secured to said rotor 91 is supported by both the bearing 140 held in said housing 141 fixed on said base plate 1 and the thrust bearing 142 on said base plate 2, and said rotor 91 is attached to said tape drive capstan 10 so as to be rotatable around the axis of said tape drive capstan 10 together with said tape drive capstan 10.

Figure 14:
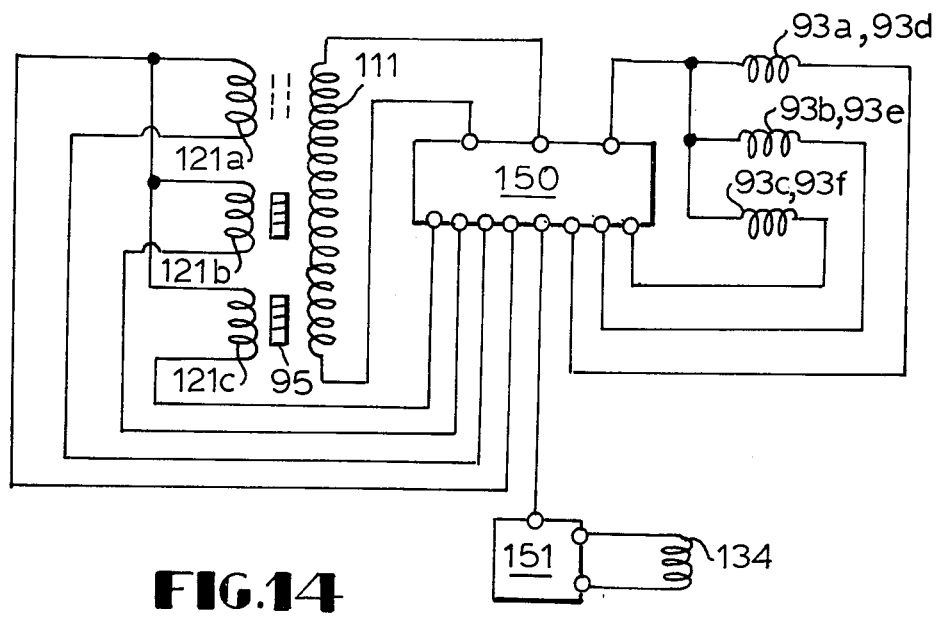
FIG. 14 is a schematic electrical circuit diagram of the electrical circuit of the apparatus.

Next, the operation of said capstan driving motor 11 which has been described above will be explained with reference to the electric driving circuit shown in FIG. 14. Said electric driving circuit comprises: an electric circuit 150 for driving the motor which has the same fundamental structure as that conventionally used in phonographic players using the so called direct drive system; an electric circuit 151 for speed controlling; said armature coils 93a–93d, 93b–93e and 93c–93f; said active coil 111; and said passive coils 121a, 121b and 121c of said distributing means. The electric speed controlling circuit 151 is electrically connected to said electric motor driving circuit 150, and further, said generating coil 134 of said speed controlling means is electrically connected to said electric speed controlling circuit 151.

At the same time electric power is supplied, alternating current of high frequency is continuously supplied to said active coil 111, and as has been explained above with reference to FIG. 10 and FIG. 11, voltages are induced in each one of said passive coils 121 which are out of phase from each other by a given phase difference according to the relative positions of said passive coils 121a, 121b and 121c, and said distribution plate 95, as shown in FIG. 12. For example, as shown in FIG. 14, there is induced a maximum voltage in said passive coil 121a which is completely unshielded, with respect to the electromagnetic coupling, by said radial legs 95a, 95b, 95c and 95d of said distribution plate 95. Because said passive coil 121 is electrically connected to said armature coils 93 by said electric motor driving circuit 150, an electric current is conducted to said armature coils 93 according to the three phase induction voltage generated in said passive coil 121 under the control of said distribution plate 95, and said capstan driving motor 11 is rotated by the rotational force produced in said magnet 90 held on said rotor 91.

As said distribution plate 95 is also rotated by said rotor 91, the voltages shown in FIG. 12 are sequentially generated in respective ones of said passive coils 121, and said capstan driving motor 11 can be kept rotating by sequential switching of the electric current to said armature coils 93 at the crossing points A, B and C of the respective voltages. In order to get a smooth continuous rotation of said rotor 91, the given relationships of the positions of the magnetic poles of said magnet 90 and said distribution plate 95, and of said passive coils 121 and said armature coils 93 are important.

Whether the rotation of said capstan driving motor 11 is at the desired speed or not is checked by comparing the reference voltage with the voltage which is generated in said generation coil 134 due to the rotation of said rotor 91 according to the number of the teeth of said toothed portion 98 and which is then processed by said electric circuit 151 for speed controlling, so as to control the current applied to the armature coils 93 so that the motor will rotate at the desired constant speed. Since the fundamental principles of the above described distributing means and speed controlling means are same as those of well-known means used in the prior art, a detailed explanation is omitted here. Said reel driving motor 18 is driven in the same way as that described above for said capstan driving motor 11.

In the above described examples, said tape drive capstan 10 for transporting the tape 2 at a constant peripheral velocity is driven directly by the brushless-type capstan driving motor 11 controlled to rotate at a constant speed, and at the same time, said tape winding hubs 6 and 7 are rotated by said reel driving motor 18, which is employed independently of said capstan driving motor 11, through said idle wheel 20 in order to wind up said tape 2.

Both of said magnetic heads 3 and 4 contact said tape 2 during tape recording and reproducing, and by the coaction of said pinch roller 15 and said tape drive capstan 10 directly driven by said capstan driving motor 11, said tape 2 is transported at a constant velocity and wound up around said tape winding hub 7 driven by said reel driving motor 18. For the fast feed of said tape 2 in both the forward and backward direction, the respective of said tape winding hubs 6 and 7 is driven as shown in the drawings from FIG. 3 to FIG. 5.

In addition, since said reel driving motor 18 is not so important for establishing the characteristics of tape transportation as said capstan driving motor 11, it is possible, if convenient, to use a conventional brush-type motor with or without cores the armature coils as the reel driving motor.

Special advantages of above described examples are that since said capstan driving motor has a magnet and a stator facing each other and parallel to each other in a plane perpendicular to said tape drive capstan, said tape drive capstan receives a thrust load derived from the magnetic attractive force between said magnet and said stator. Since said thrust load prevents the rotor being displaced in the axial direction of said tape drive capstan, the characteristics of said capstan driving motor are unlikely to change with the changes of the direction in which said capstan driving motor is held.

This invention makes it possible to produce a very reliable magnetic recording and/or reproducing apparatus of high quality without appreciable expenditure, wherein a tape drive capstan is directly driven by a capstan driving motor controlled to run with high accuracy without any belts, and a reel driving motor is employed for rotating the tape winding hubs directly through idle wheels in order to wind up the tape without any slipping at said tape winding hubs, so that no deterioration of tape transporting characteristics is caused by changes of environment.

The tape transporting characteristics are greatly improved in the apparatus of the invention, wherein by using a capstan driving motor and a reel driving motor such as described in above examples, the magnetic plane of the magnet which is the rotating member and the plane stator plate on which armature coils are arranged and secured face each other and are parallel, so the magnetic force between the magnet and the stator do not change during the rotation of the rotor, and highly accurate rotation of both the tape drive capstan and the tape winding hubs are achieved.

Furthermore, a highly reliable magnetic recording and/or reproducing apparatus having a long life can be obtained, wherein no trouble is caused by brushes because of the employment of the brushless-type construction as the distributing means for controlling the distribution of the electric current to the armature coils. Further, this invention make it possible to obtain a magnetic recording and/or reproducing apparatus with stable and high grade characteristics, wherein the idle wheels engage with both the tape winding hubs and the output shaft of the reel driving motor, and a frictional transmission mechanism is employed which not only allows no slip during the usual tape transportation but also slips at the time when extraordinary tape tension occurs at the end of the tape, whereby no deterioration of the tape transporting characteristics due to changes of environment occur, and the tape is prevented from being broken due to extraordinary tape tension.

Further, this invention makes it possible to produce a magnetic recording and/or reproducing apparatus having a simple construction, wherein the reel driving motor is placed at a position which is approximately midway between two tape winding hubs, so either of the two winding hubs can be rotated by only one idle wheel means depending on to the direction in which the tape is required to be transported.

Furthermore, the tape transporting characteristics are greatly improved in the apparatus of the invention, wherein since the capstan driving motor and the reel driving motor having the construction described in the above examples of the invention are employed, highly accurate rotation of the tape drive capstan and the tape winding hubs are achieved with little ripple of rotating torque.

A further advantage is that this invention makes it possible to produce a compact and slim type of magnetic tape recording and/or reproducing apparatus without appreciable additional expenditure and difficulties of production by simple constructional features, wherein said active detector coils and said passive detector coils, which are components of the distributing means comprising alternating magnetic flux combination type of position detector, are arranged inside the space enclosed by the circle line of said armature coils, and all of the passive detector coils are arranged inside the space enclosed by said active detector coil.

Furthermore, this invention makes it possible to provide a much improved apparatus for magnetic tape recording and/or reproducing, wherein said armature coils, said active detector coils and said passive detector coils each comprises a bobbin made of an insulating material which has conductive terminals, to which the ends of a conductive wire wound on said bobbin are electrically connected, and said conductive terminals are also electrically connected through said stator to an electric circuit printed on the side of said stator opposite to the side on which said armature coils are arranged. A further advantage is that said bobbins are fixed on said stator by pin-like elements inserted through the central portion of said bobbins, whereby the construction is greatly simplified, and the accurate attachment of each coil given position on said stator is made possible.

What is claimed is:

1. Magnetic tape recording and/or reproducing apparatus comprising in combination, a capstan driving motor, a pair of tape winding means, a reel driving motor, a pinch roller and at least one idle wheel, wherein:
    said capstan driving motor comprises: a magnetic tape driving capstan for driving the tape in cooperation with said pinch roller; a rotor on which said capstan is mounted and having a rotor magnet with a plurality of magnetic poles and a predetermined inertia; a stator having a plurality of armature coils arranged is a driving relationship with said magnetic poles of said rotor magnet; distributing means for controlling the distribution of electric current to said armature coils; speed controlling means connected to said motor for keeping said capstan rotating at a constant peripheral velocity; and driving circuits connected to said distributing means and said armature coils for supplying electric current to said armature coils for rotating said rotor;
    said pair of tape winding means comprise: a first tape winding hub for supplying said magnetic tape; and a second tape winding hub for taking up said magnetic tape;
    said reel motor being spaced from said tape winding means and being rotatable in both directions;
    said at least one idle wheel means selectively engageable with the output shaft of said reel driving motor and one or the other of said tape winding means for rotating the corresponding tape winding means;
    whereby said magnetic tape is transported at a given constant velocity by co-action of said capstan rotating at a constant peripheral velocity and said pinch roller during tape recording or reproducing, and is wound up by said second tape winding hub engaged with and rotated by said idle wheel means which is engaged therewith and at the same time with the rotating output shaft of said reel driving motor, and for fast feed of said magnetic tape in both the forward and backward directions, said pinch roller is separated from said capstan, and one of said tape winding means takes up said magnetic tape according to the direction in which said magnetic tape is required to be transported, said tape winding means being rotated by said idle wheel means engaged with both said tape winding means and the rotating output shaft of said reel driving motor.

2. Apparatus according to claim 1, wherein said rotor magnet comprises a flat hollow cylindrical magnet having said plurality of magnetic poles on a face thereof in the rotational plane of said rotor magnet; said stator has a flat plane stator plate on which said plurality of armature coils are positioned and which is parallel with and opposed to said face of said rotor magnet; and said capstan motor driving motor being a brushless and commutatorless type motor.

3. Apparatus according to claim 1 or 2, wherein said reel driving motor is placed at a point equidistant from said pair of tape winding means, and said idle wheel means has a single idle wheel which is simultaneously engagable with both the output shaft of said reel driving motor and a respective one of said tape winding means.

4. Apparatus according to claim 1 or 2, wherein said apparatus further comprises a frictional transmission mechanism between said output shaft of said reel driving motor and said tape winding means for transmitting the rotation of said output shaft of said reel driving motor to the respective tape winding means through said frictional transmission mechanism and said idle wheel means, said frictional transmission mechanism having sufficient frictional resistance for not frictionally slipping during tape recording or reproducing, so that rotation of said idle wheel means is directly transmitted to the respective tape winding means, and for permitting frictional slip only when tape tension is extraordinarily increased at the end of tape transporting at high speed during fast feed in both the forward and backward directions.

5. Apparatus according to claims 1 or 2, wherein said distributing means comprises, in combination:
    a position signal distributor and a position signal detector, said position signal distributor being mounted on said rotor for providing the rotational phase of said rotor, said position signal detector being mounted on said stator plate for generating position signals according to the rotational phase of said rotor produced by said position signal distributor, said plurality of armature coils being substantially on a circle coaxial with the rotational axis of said rotor, and said distributing means being inside the space enclosed by the line around the outside of said armature coils, and said position signal detector and said armature coils both being on the stator plate facing the face of said rotor having therein said magnetic poles and said position signal distributor.

6. Apparatus according to claim 5, wherein said position signal detector comprises a single active detector coil and a plurality of passive detector coils, said active detector coil being substantially coaxial with the center of the rotational axis of said rotor, and said passive detector coils being substantially in a circle coaxial with the rotational axis of said rotor and inside the space enclosed by said active detector coil, whereby said position signal distributor distributes the magnetic flux generated from said active detector coil to said passive detector coils in order according to the rotational phase of said rotor in order to induce voltage with a predetermined alternating period.

7. Apparatus according to claim 6, wherein the surface of said stator opposite to the surface thereof on which said armature coils are arranged has a printed circuit base thereon with a printed circuit on said base, and at least one of said armature coils, said active detector coils and said passive detector coils comprises a bobbin of an insulating material, a wire wound thereon, and conductive terminals to which the ends of said conductive wire are electrically connected, and said conductive terminals also being electrically connected to the printed circuit on said base.

8. Apparatus according to claim 6, wherein each of said armature coils, said active detector coils and said passive detector coils comprises a bobbin, and a conductive wire would on said bobbin, said bobbin having conductive terminals to which the ends of said conductive wire are electrically connected, and each bobbin being fixed on said stator.

9. Apparatus according to claim 6 wherein each one of said armature coils, said active detector coils and said passive detector coils comprises a bobbin, and conductive wire wound on said bobbin, said bobbin having conductive terminals to which the ends of said conductive wire are electrically connected, and said apparatus further comprises a plurality of attachment means, one for each bobbin, having a stop portion and a connecting portion extending through said bobbin, said stop portion pressing said bobbin to said stator and said connecting portion being secured to said stator to fix said bobbin on said stator.

10. Apparatus according to claim 6, wherein said position signal distributor comprises magnetic flux switching means and magnetic flux conducting means, said magnetic flux switching means having a plurality of magnetic flux shielding portions and magnetic flux passing portions alternating around the rotational axis of said rotor and facing said active and passive detector coils, and said magnetic flux conducting means being of material having a low energy loss for transmitting high frequency magnetic flux and being coaxially disposed relative to the rotational axis of said rotor.

11. Apparatus according to claim 5, wherein said capstan motor and said reel motor are both the same type motor, and said apparatus has a single stator plate mounted therein as a common stator for both said capstan driving motor and said reel driving motor, each one of the armature coils for both said capstan and said reel driving motor being mounted on said common stator.

12. Apparatus according to claim 1 or 2, wherein said reel driving motor is a coreless type motor.

* * * * *